W. G. BULGIN
Grain-Drill.
No. 22,622.    Patented Jan 18, 1859.
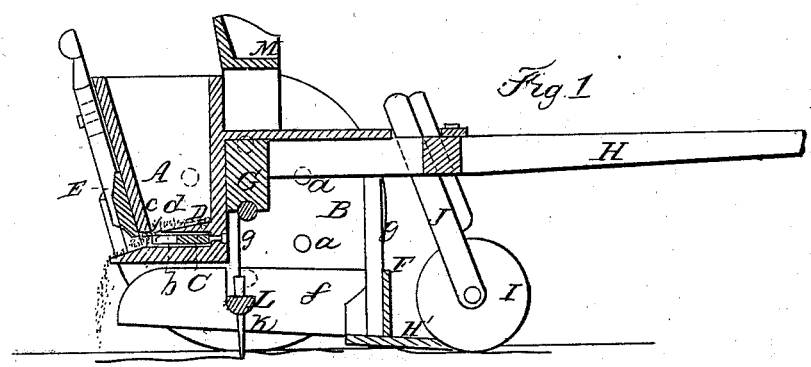
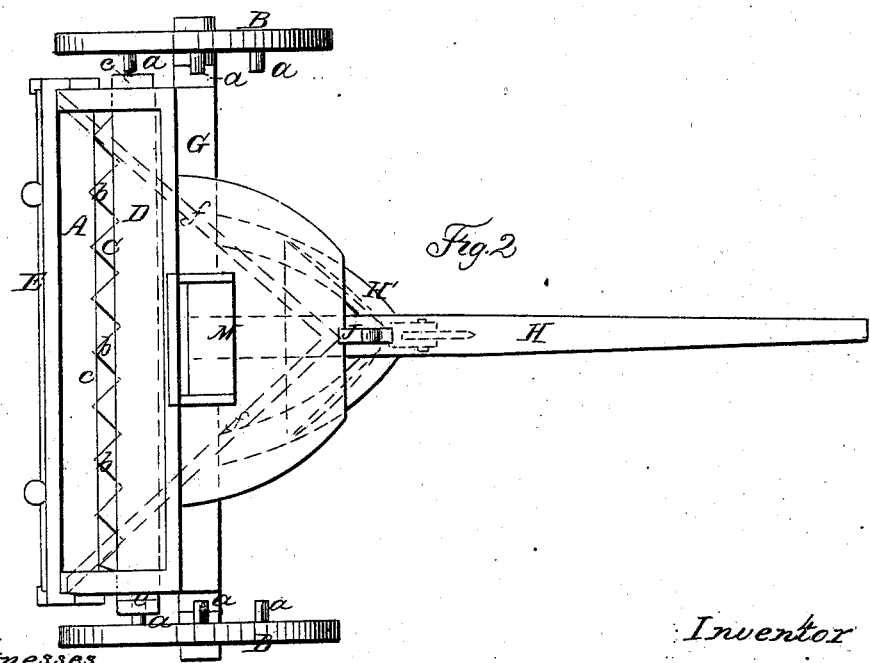

UNITED STATES PATENT OFFICE.

W. G. BULGIN, OF WEST JERSEY, ILLINOIS.

IMPROVEMENT IN SEEDING-MACHINES.

Specification forming part of Letters Patent No. 22,622, dated January 18, 1859.

*To all whom it may concern:*

Be it known that I, W. G. BULGIN, of West Jersey, in the county of Stark and State of Illinois, have invented a new and Improved Seeding-Machine; and I do hereby declare that the following is a full, clear, and exact description of the same, reference being had to the annexed drawings, making a part of this specification, in which—

Figure 1 is a longitudinal vertical section of my invention. Fig. 2 is a plan or top view of the same.

Similar letters of reference indicate corresponding parts in the two figures.

This invention is more especially designed for use in the western States, where wheat is sown directly on corn-stubble not previously plowed.

The object of the invention is to properly prepare the soil for the reception of the seed by leveling and pulverizing the same, and in distributing the seed evenly and in a uniform manner in the prepared soil.

The invention consists in the peculiar means employed for attaining the desired ends—to wit, a rotary colter, leveler, and harrow-teeth arranged relatively in respect to each other, and a seed-distributing device, as hereinafter fully shown and described.

To enable those skilled in the art to fully understand and construct my invention, I will proceed to describe it.

A represents a seed-box, which is mounted on wheels B B, each wheel being provided at its inner side with a series of projecting pins, $a$, placed in annular form. At the bottom of the seed-box A there is placed a plate, C, the back edge of which is serrated, as shown at $b$, Fig. 2. The solid or front portion of the plate C is covered by a plate, D, so that the serrated portion only is exposed. At the bottom of the back side, $c$, of the hopper there is a space or opening, $d$, which is covered by a slide, E, so that the space or opening $d$ may be contracted, if necessary. The ends of the plate C extend through the ends of the seed-box A, each end of the plate being rounded, or having a convex button attached, as shown at $e$.

F is a leveler, formed of two boards or plates, $ff$, placed in V form, and attached to uprights $g\ g$, which are secured in the axle G and in the draft-pole H, the uprights being adjustable, so that the leveler may be raised or lowered, as occasion may require.

To the front end of the leveler F a share, H', is attached. This share is of V form and nearly in a horizontal position, and projects a suitable distance in front of the leveler.

I is a rotary colter, which is fitted in the lower end of a pendant, J, attached to the draft-pole H. The colter I is in line with the point of the share H'.

K represents a series of harrow-teeth, which are fitted in a cross-piece, L, between the plates $ff$ of the leveler F. The harrow-teeth extend entirely across the space between the plates $f\ f$, and they are in line with the front lower edge of the seed-box A. (See Fig. 1.) On the axle and draft-pole the driver's seat M is attached.

The operation is as follows: The machine is drawn along directly over the rows and the colter I splits or divides the stalks or stumps of corn, while the share H' cuts off the hills and the oblique plates $f\ f$ level the earth, throwing the earth from the hills into the furrows between, and the teeth K pulverize the earth, so that it will be in proper condition to receive the seed discharged from the hopper A. The seed is discharged directly at the back of the leveler F, and by the serrated plate C, which is vibrated longitudinally by the pins $a$ on the wheels B, the pins on the wheels, as the wheels rotate, striking alternately the ends of the plate C, the notches $b$ discharging the seed from the seed-box.

I am aware that rotary colters I have been previously used, and also levelers F, or their equivalents. Seed-distributing devices, similar to the serrated plate C, have also been used; but I am not aware that the parts have been arranged relatively with each other to operate as herein shown.

I claim, therefore, as new and desire to secure by Letters Patent—

The rotary colter I, leveler F, with share H' attached, and harrow-teeth K, arranged relatively with respect to each other and to a seed-box, A, provided with a suitable seed-distributing device, so as to operate substantially as and for the purpose set forth.

W. G. BULGIN.

Witnesses:
C. W. YOUNG,
W. H. PIERSON.